5 Sheets—Sheet 1.

W. A. HALL.
Type-Writing Machine.

No. 206,439. Patented July 30, 1878.

ATTEST,
Paul Bakewell
Saml. V. Boyd

INVENTOR,
William A. Hall.
by Chas. D. Moody
his atty.

5 Sheets—Sheet 2.

W. A. HALL.
Type-Writing Machine.

No. 206,439. Patented July 30, 1878.

ATTEST.
Paul Bakewell
Saml. S. Boyd

INVENTOR.
William A. Hall
by Chas. D. Moody
his atty.

5 Sheets—Sheet 4.

W. A. HALL.
Type-Writing Machine.

No. 206,439. Patented July 30, 1878.

ATTEST,
Paul Bakewell

INVENTOR,
William A. Hall.
by Chas. D. Moody,
his atty

W. A. HALL.
Type-Writing Machine.
No. 206,439. Patented July 30, 1878.
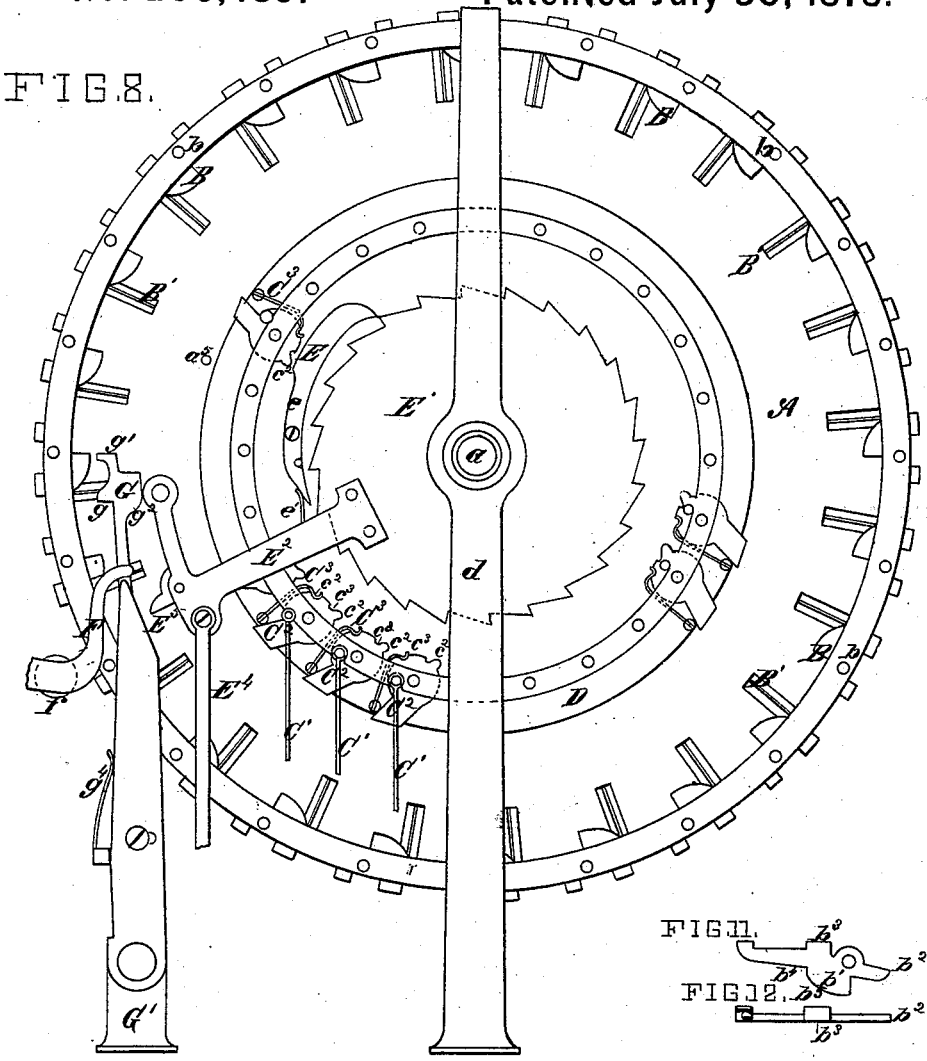
FIG.8.
FIG.11.
FIG.12.
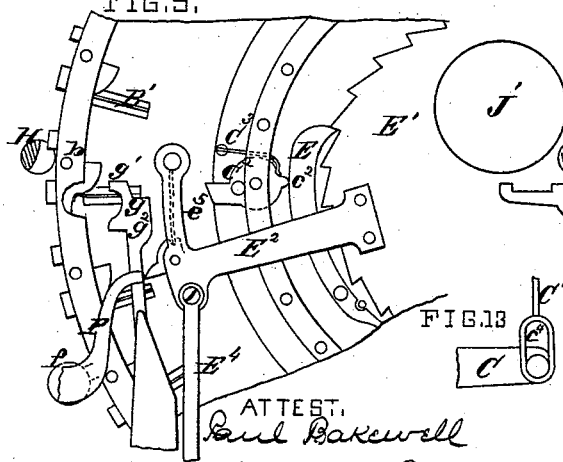
FIG.9.
FIG.13
ATTEST:
Paul Bakewell
Saml. S. Boyd
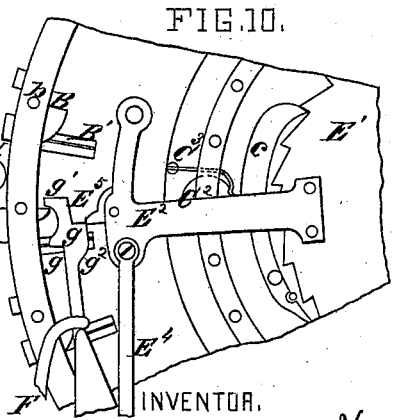
FIG.10.
INVENTOR.
William A. Hall.
by Chas. D. Moody
his atty.

UNITED STATES PATENT OFFICE.

WILLIAM A. HALL, OF ST. LOUIS, MISSOURI.

IMPROVEMENT IN TYPE-WRITING MACHINES.

Specification forming part of Letters Patent No. 206,439, dated July 30, 1878; application filed November 13, 1877.

*To all whom it may concern:*

Be it known that I, WILLIAM A. HALL, of St. Louis, Missouri, have invented a new and useful Improvement in Type-Writers, of which the following is a full, clear, and exact description, reference being had to the annexed drawings, making part of this specification, in which—

Figure 1:
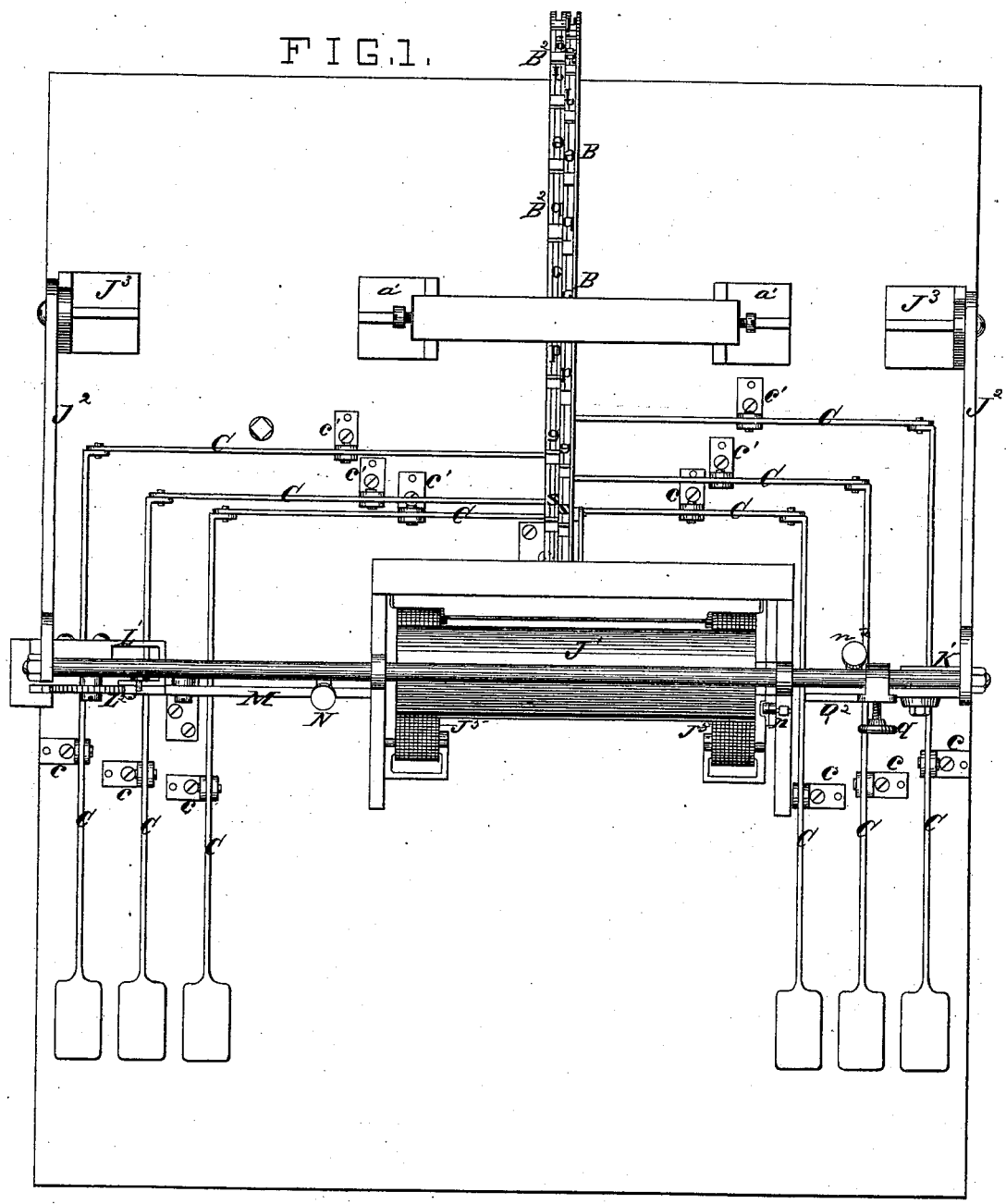
Figure 2:
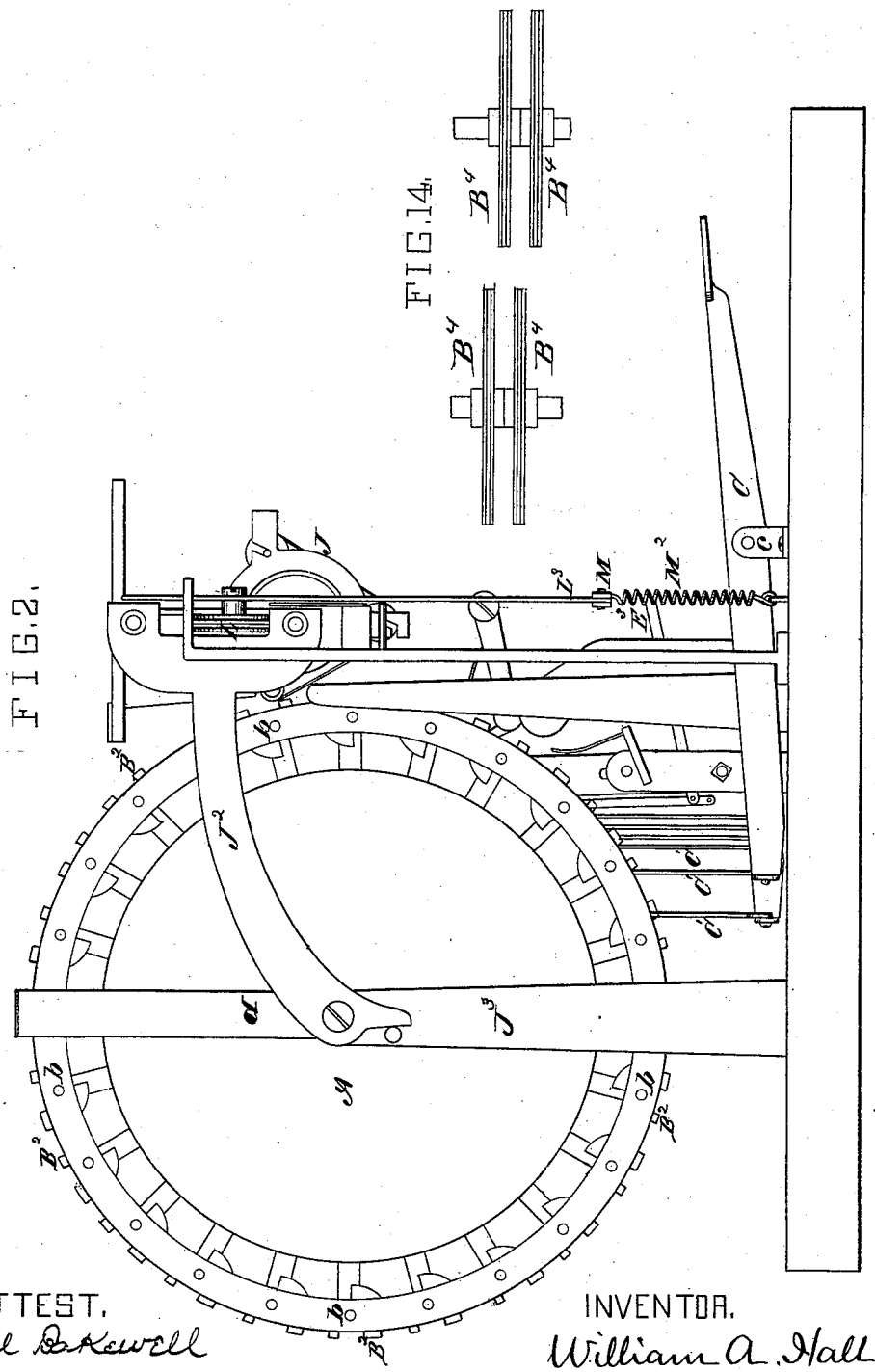
Figure 3:
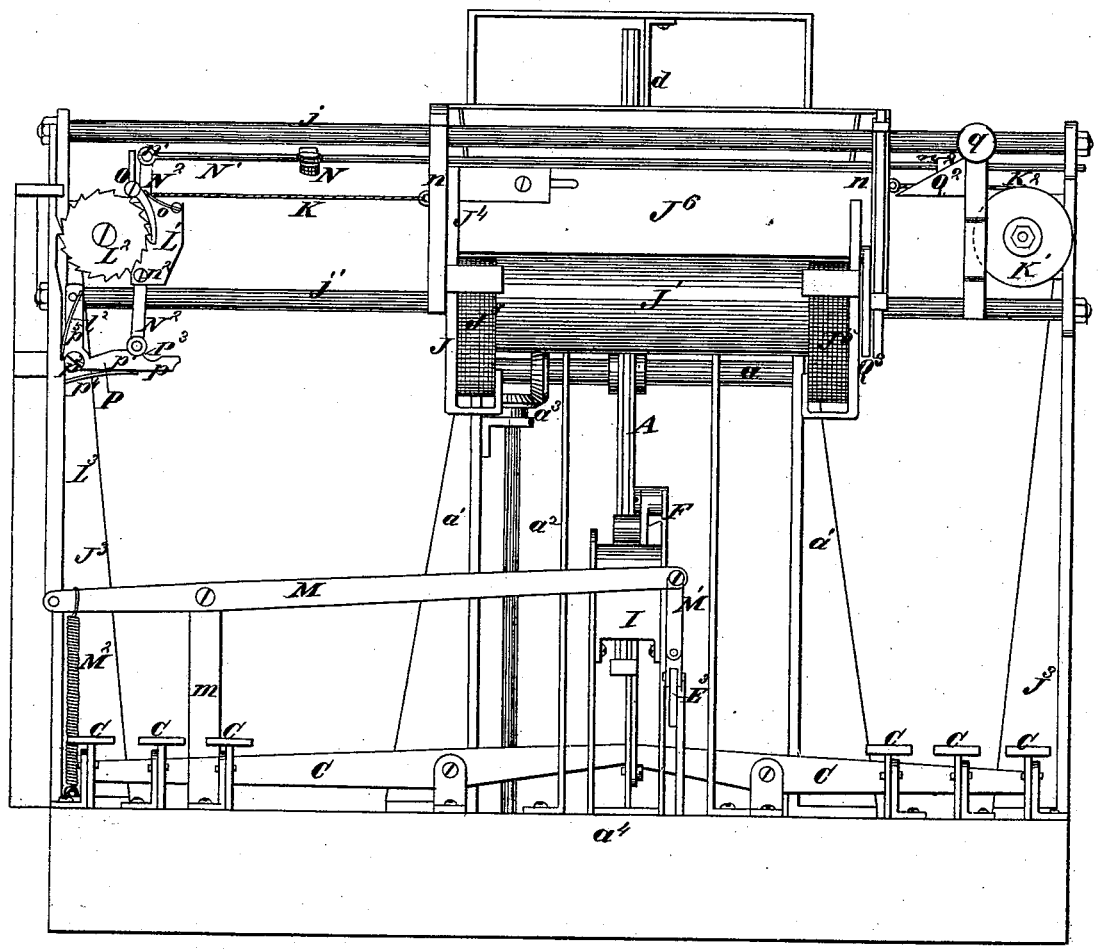
Figure 4:
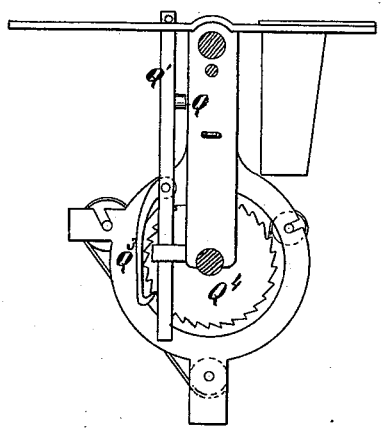
Figure 5:
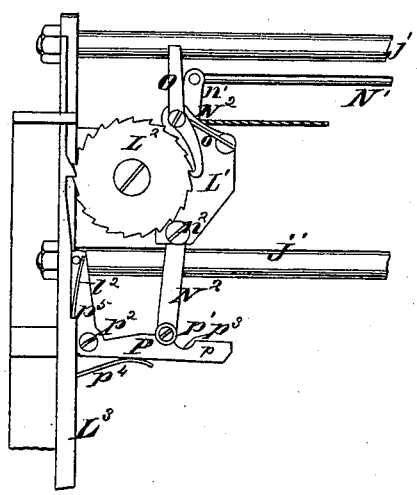
Figure 6:
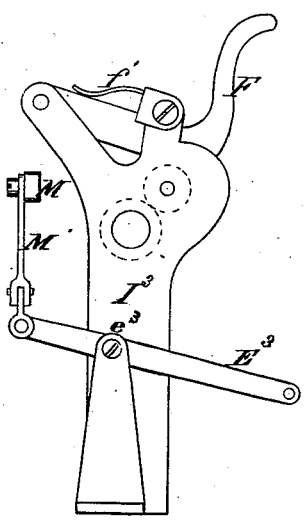
Figure 7:
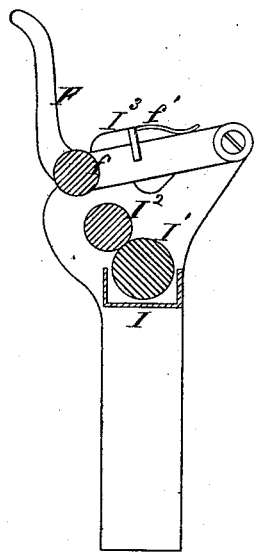

Figure 1 is a plan of the invention; Fig. 2, a side elevation; Fig. 3, a front elevation; Fig. 4, a detail, being a vertical section taken on the line $x\,x$, Fig. 3, and showing the end of the paper-carriage; Fig. 5, a detail, being a front elevation of the mechanism used to move the paper-carriage to the left as the impressions are made; Fig. 6, a detail, being an end view of the parts immediately connected with the inking mechanism; Fig. 7, a detail, being a vertical section taken through the inking-rolls, and looking in the opposite direction to that of Fig. 6; Fig. 8, a side view of the type-disk; Fig. 9, a detail showing the parts as when a type is being inked; Fig. 10, a detail, showing the parts as immediately before the type encounters the paper; Figs. 11 and 12, views of one of the types and its supporting-arm; Fig. 13, a view showing the connection of one of the key-levers with its wire, and Fig. 14 a diagram illustrating the relative arrangement of the type-disks when several of them are used.

Similar letters refer to similar parts.

In the present improvement a disk having types pivoted in and around its periphery constantly revolves, being actuated by an auxiliary power. A system of keys corresponding respectively with the types are, by means of intermediate mechanism, connected in such manner with the latter that by depressing any desired key the corresponding type is, by the operator, caused to be inked, thrown out from the periphery of the disk, impressed upon the paper, and then returned to its original position in the disk as the latter revolves. The paper meanwhile is suitably presented to the types as the latter are successively projected from the disk. The capacity of the machine is enlarged by employing several type-disks with corresponding banks of keys connected therewith.

Referring to the annexed drawings, A represents the type-disk. It is attached to the shaft $a$. The latter may be supported by the standards $a^1\,a^1$, or in other suitable manner. The disk, by some auxiliary power—say a spring contained within the base of the frame of the machine, actuating a shaft, $a^2$, geared at $a^3$ to the shaft $a$—is kept constantly in motion, and preferably at a speed of two hundred revolutions a minute.

B B B represent types, pivoted to the disk at $b\,b\,b$, respectively, and so that the ends of the types bearing the characters can be thrown out from the periphery of the disk and brought into position for encountering the paper to be printed.

C C C represent a series of keys corresponding to the types in the disk. By depressing the keys the types are caused to be projected from the disk, and in the following manner: The keys are similarly pivoted to the base $a^4$ at $c\,c^1$, so that when the outer end of a key is depressed its inner end draws down a wire, $C^1$, that is connected with it. The wires $C^1\,C^1\,C^1$, at their upper ends, are connected, respectively and similarly, with what I term the "triggers" $C^2\,C^2\,C^2$, that are in turn pivoted in a circular frame, D. The latter is fastened to the standard $d$. As a wire, $C^1$, is drawn down the corresponding trigger $C^2$ is turned, so that a projection, $c^2$, is projected inward from the frame D, and so that it comes in the way of a pawl, E, that is pivoted to and moves around with the disk A, causing the pawl to be deflected and to engage with a ratchet, $E^1$. The latter is loose upon the shaft $a$, and is arranged to have a reciprocating rotary movement thereon. The ratchet is provided with an arm, $E^2$, extending outward therefrom, so as to come, (as the ratchet rotates,) first, against a lever, F, lifting the latter and causing an inking-roller, $f$, that is attached to the lever, to come in contact with the face of the type that is to be used; and, second, against the upper end of a lever or rack, G. The latter, at its lower end, is attached to a standard, $G^1$, and is arranged to have a slight reciprocating movement thereon. As the arm $E^2$ continues to be swept around it presses the rack G outward sufficiently to bring it into engagement with the inner end of that type that has first been inked, causing the type to turn on its bearing in the disk, and so as to project the face of the type into position for encountering the paper. The particular manner of effecting the engagement of the rack G and type is as follows: The lever is provided with teeth $g$ $g^1$, that engage respectively with the projections $b^1$ $b^2$ on the type, in manner similar to the engagement of a rack and pinion. The parts are arranged and constructed so that the end of the arm $E^2$ encounters a boss, $g^2$, on the lever G as the latter is being pressed into engagement with the type. As soon as the arm passes this boss, a spring, $g^4$, acts to throw the lever G back from the type, and immediately afterward the projection $c^2$ on the trigger falls into a depression, $e$, in the back of the pawl E. This allows a spring, $e^1$, to act to throw the pawl out of the ratchet $E^1$, whereupon a lever, $E^3$, actuated in manner hereinafter described, and operating through a rod, $E^4$, that connects the lever $E^3$ and arm $E^2$, operates to draw the latter and the ratchet $E^1$ back to their original positions. To enable the arm $E^2$, in its downward movement, to pass the boss $g^2$, the extreme end $E^5$ of the former is pivoted to the main portion of the arm, enabling it to fold up thereupon as the arm goes down. A spring, $E^6$, acts to throw it out again when the boss is passed. As the disk rotates, a stop, $a^5$, thereon encounters the outer beveled end of the trigger, causing the latter to be turned back into its original position, and as before the wire $C^1$ acted on it. A spring, $C^3$, assists in holding the trigger at either limit of its vibration, and by its end dropping into the recesses $c^3$ $c^3$. The outer end of the trigger, as it is moved by the stop $a^5$, encounters the outer or fixed end of the spring $C^3$, which aids in arresting the vibration of the trigger in that direction.

The type, after striking the paper, rebounds slightly therefrom, in practice, and immediately thereafter encounters a stationary bar, H, and is thereby turned back into its original position. The bar is preferably made to encounter a projection, $b^3$, on the type. As the type is turned back it meets a spring, $B^1$, the free end of which, when the type is entirely back, comes endwise against the type at $b^4$, and which, when the type is being turned, rides upon the curved back of the shoulder $b^5$. The back of the face of the type, as the latter is turned back, also encounters the edge of the disk A, which aids in preventing the type from being thrown inward farther. The connection between the key-lever C and the wire $C^1$ is elongated, as shown in Fig. 13. This enables the inner end of the lever, after it has drawn the wire down, to rise again, so that when the trigger is turned back the wire only will have to be lifted. The types B B B are similarly operated, and in any desired order, the keys and types and the intermediate mechanism having such relative arrangement as to enable any key that it is desired to strike to cause the arm $E^2$ to press the rack G into engagement with the corresponding type.

The inking apparatus is shown more distinctly in Figs. 6 and 7. I represents the ink-trough, and $I^1$ $I^2$ a pair of inking-cylinders, that are rotated by any suitable means. The roll $f$ takes the ink from the latter cylinder, $I^2$, with which it is in contact saving when it is lifted therefrom against the types, in manner above described. A spring, $f'$, extending from the frame $I^3$, operates to throw the lever F down as soon as the arm $E^2$ passes it.

J represents the paper-carriage. It is supported and arranged to move laterally upon the bars $j$ $j'$. The latter are arranged at right angles to the plane of the disk A, and at a suitable height for the types, as the latter are thrown out from the disk, to strike the paper, which passes around the under side of the cylinder $J^1$.

The usual movements of the paper-carriage are provided for as follows. The slight lateral movement to the left, as each type is impressed, and sufficiently to bring the paper into position to receive the impression of the succeeding type, is effected thus: A cord, K, passes from the carriage to and around a pulley, L, attached thereto, whose shaft is journaled in a frame, $L^1$. A ratchet-wheel, $L^2$, is fastened to the pulley-shaft. As each type is printed the ratchet is caused to move the space of one tooth, and, in consequence, to turn the pulley and move the carriage correspondingly the desired distance. The same mechanism that operates to replace the ratchet $E^1$ and arm $E^2$ is used for moving the ratchet $L^2$, as follows: A lever, M, pivoted to a standard, $m$, at its right-hand end, (as seen in the drawing,) is jointed to a link, $M^1$, that in turn is jointed to the lever $E^3$, and at its left-hand end is jointed to a hook, $L^3$, that engages with the ratchet $L^2$. The lever $E^3$ is pivoted at $e^3$. A spring, $M^2$, fastened at its lower end to the frame of the machine and at its upper end to the lever M, acts to draw down the left-hand end of the lever whenever the lever $E^3$ is released. This accomplishes two results—the arm $E^2$ and ratchet $E^1$ are returned to their original positions, and the hook $L^3$ is drawn down, turning the ratchet $L^2$ and pulley L. A spring, $l^2$, presses the hook $L^3$ against the ratchet $L^2$. This lateral movement continues until the end of the line being printed is reached, at which time the carriage will have encountered a stop, N, that is fastened to a rod, $N^1$. The latter extends across the machine, (being supported in the bearings $n$ $n$,) and is pivoted to the upper end of a lever, $N^2$. This last-named lever is pivoted at $n^2$ to the same bracket that supports the pulley L and ratchet $L^2$. As the carriage strikes the stop N the rod $N^1$ is thrust back, bringing a projection, $n^1$, against the upper end of a pawl, O. The latter, until the projection strikes it, is, by means of a spring, $o$, kept in engagement with the ratchet $L^2$. The lower end of the lever $N^2$ comes, at $p^1$, against the arm $p$ of a bell-crank lever, P, that is pivoted to a support at $p^2$. The parts are adjusted so that as the projection $n^1$ strikes the pawl O the lower end of the lever $N^2$ moves away from the shoulder $p^1$ until it is over a depression, $p^3$. Two results follow—the pawl O is thrown out of the ratchet $L^2$, and the arm $p$, being actuated by a spring, $p^4$, is moved upward, causing the other arm, $p^5$, of the lever to press the hook $L^3$ also out of the ratchet $L^2$. The latter is now free to turn backward, whereupon a spring, $K^1$, acting through the cord $K^2$, immediately draws the carriage the width of the column to the right. As the carriage reaches the limit of its movement in this last-named direction it encounters a stop, $n^2$, on the rod $N^1$, drawing, in consequence, the rod to the right again, and allowing the pawl O and hook $L^3$ to re-engage with the ratchet $L^2$. At the same time a roller, Q, that is attached to a bar, $Q^1$, (this bar is connected with the paper-carriage,) rides upon an inclined plane, $Q^2$, causing the bar $Q^1$ to be lifted. A pawl, $Q^3$, is pivoted to the bar, and is arranged to engage, as the bar is lifted, with a ratchet-wheel, $Q^4$, that is attached to the end of the paper-cylinder $J'$. Therefore, as the bar lifts, the cylinder is rotated accordingly. This causes the paper to be drawn around the cylinder and into position for the next line to be printed thereon. The spaces between the lines can be regulated by setting the inclined plane $Q^2$ so that the roller Q will ride more or less upon it, as desired. This is done by moving the plane properly upon the bar $j$, and then clamping it by means of the screw $q$.

If the space between the lines needs to be wider, the plane is set so that the roller can pass farther up on it, and by moving the plane in the other direction the spaces are made narrower.

Stops N and $n^2$ are also adjustable on the rod $N^1$. The pawl O is necessary to hold the ratchet $L^2$ from turning back as the hook $L^3$ is being lifted by the lever M.

The paper carriage is supported by the arms $J^2 J^2$, that, at their inner ends, are pivoted to the standards $J^3 J^3$. This enables the carriage to be lifted and turned back, so that the printed matter can be readily examined.

The bracket $J^4$, that supports the tape $J^5$, is made adjustable laterally upon the plate $J^6$ to accommodate papers of different widths.

The disk A is further provided with a duplicate set, $B^2 B^2 B^2$, of types, similarly pivoted to the disk, but arranged on the opposite side of the periphery of the disk. The two sets of types B B B and $B^2 B^2 B^2$ will then be arranged in planes, spaced apart the ordinary distance between letters in print.

The set $B^2 B^2 B^2$ may be operated in manner and by means similar to that above described for the set B B B—that is, a duplicate set of keys, constituting a second bank, together with the intermediate mechanism, will be employed.

It is also my intention to employ, preferably, as many as four disks, each whereof having the two sets B $B^2$ of types. Two of the disks will be arranged on one side and two upon the other side of the paper-carriage, and all so arranged relatively as to enable the various sets of type to strike the paper properly, and as indicated in Fig. 14.

When four disks are used there will therefore be eight banks of keys, similarly connected with their respective sets of types. This will enable one type in each set to be simultaneously impressed upon the paper, and thus very materially hasten the operation.

When two or more sets of types are thus used the paper-carriage, instead of being drawn laterally every time a type is struck a distance equal to that between two adjoining letters, will be drawn as many times that distance as there are types simultaneously struck; and, to provide for this last-named movement, the lever M will be made adjustable on its bearing $m$, and so as to lengthen the distance between the latter and the hook $L^3$ proportionately to the number of types being struck simultaneously. This will enable the hook $L^3$ to turn the ratchet $L^2$ and draw the cord K accordingly.

The spaces between adjoining words are obtained by omitting to strike a key in that bank that corresponds with the space in question.

As shown, the various standards for supporting the type-disk and other surrounding mechanism are arranged in the central part of the base of the machine.

In practice this arrangement will be changed. The various sets of keys will occupy this space, and the disks and other parts will be supported by overhanging brackets.

I claim—

1. In a type-writer, a revolving disk or frame having types pivoted thereto, substantially as described.

2. In a type-writer, a revolving disk or frame having two sets of types, B B B and $B^2 B^2 B^2$, pivoted thereto, substantially as described.

3. The combination, in a type-writer, of an independently-rotating disk or frame, having types pivoted thereto, and a series of keys corresponding to such types and connected respectively therewith, substantially as described.

4. The combination of the disk or frame A, having the types B B B pivoted thereto, and the paper-cylinder $J^1$, substantially as described.

5. The combination of the disk A, types B B B, pivoted to said disk, and rack G, substantially as described.

6. The combination of the disk A, types B B B, rack G, arm $E^2$, and ratchet $E^1$, substantially as described.

7. The combination of the disk A, types B B B, pawl E, ratchet $E^1$, arm $E^2$, and rack G, substantially as described.

8. The combination of the frame D, triggers $C^2 C^2 C^2$, wires $C^1 C^1 C^1$, pawl E, and ratchet $E^1$, substantially as described.

9. The combination of the rack G and the arm $E^2$, having the folding end $E^5$, substantially as described.

10. The combination of the lever F, roll $f$, types B B B, disk A, and arm $E^2$, having the folding end $E^5$, substantially as described.

11. The combination of the disk A, types B B B, and bar H, substantially as described.

12. The combination of the wire $C^1$, having the loop $c^4$, and the key C, substantially as described.

13. The combination of the disk A, having the stop $a^5$, triggers $C^2$ $C^2$ $C^2$, and frame D, substantially as described.

14. The combination of the pawl E, having the depression $e$, and the trigger $C^2$, having the projection $c^2$, substantially as described.

15. The combination of the frame D, triggers $C^2$ $C^2$ $C^2$, and springs $C^3$ $C^3$ $C^3$, substantially as described.

16. The combination of the disk A, types B B B, and springs $B^1$ $B^1$ $B^1$, substantially as described.

17. The combination of the disk A, pivoted types B B B, rack G, and cylinder $J^1$, substantially as described.

18. The combination of the pivoted type B B B, having the projections $b^1$ $b^2$, and the rack G, having the teeth $g$ $g^1$, substantially as described.

19. The combination of the trigger $C^2$, pawl E, spring $e^1$, rod $E^4$, arm $E^2$, and ratchet $E^1$, substantially as described.

20. The combination of the keys C C C, wires $C^1$ $C^1$ $C^1$, triggers $C^2$ $C^2$ $C^2$, frame D, disk A, pawl E, and ratchet $E^1$, substantially as described.

21. The combination of the pivoted triggers $C^2$ $C^2$ $C^2$, pawl E, and ratchet $E^1$, substantially as described.

22. The combination of the lever G, boss $g^2$, arm $E^2$, folding end $E^5$, and spring $e^5$, substantially as described.

23. The combination of the keys C C C, wires $C^1$ $C^1$ $C^1$, triggers $C^2$ $C^2$ $C^2$, frame D, pawl E, ratchet $E^1$, arm $E^2$, rack G, and the disk A and type B B B, substantially as described.

24. The combination of the ratchet $E^1$, arm $E^2$, rod $E^4$, lever $E^3$, link $M^1$, lever M, and spring $M^2$, substantially as described.

25. The combination of the disk A, pivoted type B B B, rack G, standard $G^1$, and spring $g^4$, substantially as described.

26. The combination of the disk A, pivoted type B B B, and the pivoted rack G, substantially as described.

27. The combination of the carriage J, stop N, rod $N^1$, lever $N^2$, lever P, hook $L^3$, and ratchet $L^2$, substantially as described.

28. The combination of the carriage J, rod $N^1$, stop $n^2$, levers $N^2$ P, hook $L^3$, spring $P^5$, and ratchet $L^2$, substantially as described.

29. The combination of the carriage J, stop N, rod $N^1$, lever $N^2$, cord $K^2$, pawl O, ratchet $L^2$, drum L, and spring $K^1$, substantially as described.

30. The bracket $J^4$, plate $J^6$, and tape $J^5$, combined as and for the purpose of adjusting the latter to papers of different widths.

WILLIAM A. HALL.

Witnesses:
SAMUEL MARSDEN,
CHAS. D. MOODY.